(12) United States Patent
Katoh et al.

(10) Patent No.: US 7,744,976 B2
(45) Date of Patent: Jun. 29, 2010

(54) CURABLE PRESSURE SENSITIVE ADHESIVE COMPOSITION, OPTICAL DISK PRODUCING SHEET, AND OPTICAL DISK

(75) Inventors: Kazuya Katoh, Arlington, MA (US); Shin Kubota, Yokohama (JP); Sou Miyata, Matsudo (JP)

(73) Assignee: Lintec Corporation, Tokyo (JP)

( * ) Notice: Subject to any disclaimer, the term of this patent is extended or adjusted under 35 U.S.C. 154(b) by 546 days.

(21) Appl. No.: 11/071,280

(22) Filed: Mar. 4, 2005

(65) Prior Publication Data
US 2005/0202196 A1 Sep. 15, 2005

(30) Foreign Application Priority Data
Mar. 9, 2004 (JP) .............................. 2004-065241

(51) Int. Cl.
*B32B 9/00* (2006.01)
*B41J 2/01* (2006.01)
(52) U.S. Cl. ..................... 428/40.1; 428/40.2; 428/41.7; 428/41.8; 428/42.1; 347/102; 347/107
(58) Field of Classification Search ................ 428/40.1, 428/40.2, 41.7, 41.8, 42.1; 347/107, 102
See application file for complete search history.

(56) References Cited

U.S. PATENT DOCUMENTS 6,883,908 B2 * 4/2005 Young et al. ................. 347/102
6,950,236 B2 * 9/2005 Hokazono et al. ........... 359/586
2002/0119274 A1 * 8/2002 Yang et al. .................. 428/40.1

FOREIGN PATENT DOCUMENTS

WO    WO 03/041058 A2    5/2003
WO    WO 03/041058 A3    5/2003

OTHER PUBLICATIONS

Office Action from European Patent Office issued on Sep. 1, 2005 for the corresponding European patent application No. 05251384.3-2109 (English translation thereof).

* cited by examiner

*Primary Examiner*—Victor S Chang
(74) *Attorney, Agent, or Firm*—Posz Law Group, PLC

(57) ABSTRACT

A curable pressure sensitive adhesive composition is made to contain a polymer-containing energy rays-curable component and fine particles having an average particle diameter of not more than 30 nm, wherein the solid content of the fine particles is made to be from 5 to 60 wt %. A stamper-receiving layer or a curable pressure sensitive adhesive layer for bonding a protective layer is formed using this curable pressure sensitive adhesive composition, thus producing an optical disk producing sheet. This optical disk producing sheet has a low volume shrinkage rate upon curing, and has excellent adhesiveness. If this optical disk producing sheet is used, then an optical disk having little warping and excellent inter-layer adhesion can be obtained.

12 Claims, 4 Drawing Sheets

CURABLE PRESSURE SENSITIVE ADHESIVE COMPOSITION, OPTICAL DISK PRODUCING SHEET, AND OPTICAL DISK

TECHNICAL FIELD

The present invention relates to a curable pressure sensitive adhesive composition, an optical disk producing sheet and an optical disk, and in particular to a curable pressure sensitive adhesive composition and an optical disk producing sheet suitable for bonding a protective layer or forming a stamper-receiving layer in optical disk production, and an optical disk produced using the optical disk producing sheet.

BACKGROUND ART

As optical disks, ones constituted from an optical disk substrate made of a polycarbonate, an information recording layer formed on the optical disk substrate, and a protective film bonded to the information recording layer by an adhesive layer are generally known. In the case that the optical disk is read only, a concavo-convex pattern constituting pits is formed on the information recording layer, and in the case that the optical disk is rewritable, a concavo-convex pattern constituting grooves and lands is formed on the information recording layer.

As a method of forming such an information recording layer, for example a method is known in which a photocurable film (corresponding to a stamper-receiving layer) made of a photocurable resin is laminated onto an optical disk substrate made of a polycarbonate, next a stamper is pressed against the photocurable film, and in this state the photocurable film is cured by irradiating with light, and then the photocured film and the stamper are separated from one another, and a light-reflecting layer is formed on the embossed surface of the photocured film (Japanese Patent No. 2956989).

Moreover, as a method of bonding a protective film and an information recording layer together, for example a method is known in which a photocurable resin is coated onto the protective film or the information recording layer to form an adhesive layer, and then the protective film and the information recording layer are stuck together using this adhesive layer (Japanese Patent Application Laid-open No. 10-283683).

Such a photocurable resin shrinks during the curing reaction upon irradiation with light, and due to this cure shrinkage of the photocurable resin, there have been a problem of the adhesive strength of the stamper-receiving layer to the optical disk substrate, or the adhesive strength of the adhesive layer to the protective film or the information recording layer dropping, and hence the layers peeling away from one another during production of an optical disk or during storage of a produced optical disk, and a problem of warping of obtained optical disks occurring.

DISCLOSURE OF THE INVENTION

The present invention has been accomplished in view of this state of affairs; it is an object of the present invention to provide a curable pressure sensitive adhesive composition that has a low volume shrinkage rate upon curing and has excellent adhesiveness, an optical disk producing sheet that has excellent adhesiveness to a bonded layer and according to which warping of an optical disk obtained therefrom can be suppressed, and an optical disk having little warping and excellent inter-layer adhesion.

To attain the above object, the present invention firstly provides a curable pressure sensitive adhesive composition comprising a polymer-containing energy rays-curable component and fine particles having an average particle diameter of not more than 30 nm, wherein the solid content of the fine particles is from 5 to 60 wt % (invention 1).

In the case of the above invention (invention 1), the fine particles are preferably inorganic oxide particles modified with an organic material (invention 2).

Secondly, the present invention provides an optical disk producing sheet comprising a curable pressure sensitive adhesive layer formed using the curable pressure sensitive adhesive composition as described above (invention 1 or 2) (invention 3).

In the case of the above invention (invention 3), preferably, a sheet constituting an optical disk protective layer is laminated on one surface of the curable pressure sensitive adhesive layer, and if necessary a release sheet is laminated on the other surface of the curable pressure sensitive adhesive layer (invention 4), or alternatively the curable pressure sensitive adhesive layer is a stamper-receiving layer, and if necessary a release sheet is laminated on one surface or both surfaces of the stamper-receiving layer (invention 5).

In the case of the above inventions (inventions 3 to 5), the curable pressure sensitive adhesive layer has a pre-curing storage elastic modulus of from $1 \times 10^3$ to $5 \times 10^6$ Pa, and has a post-curing storage elastic modulus of at least $1 \times 10^8$ Pa (invention 6).

Thirdly, the present invention provides an optical disk produced using an optical disk producing sheet as described above (any of inventions 3 to 6) (invention 7).

EFFECTS OF THE INVENTION

A curable pressure sensitive adhesive composition of the present invention has a low volume shrinkage rate upon curing, and high adhesive strength. Moreover, a curable pressure sensitive adhesive layer formed using the curable pressure sensitive adhesive composition of the present invention has high rigidity after curing, and is also able to prevent corrosion of metal in a layer in the vicinity of the curable pressure sensitive adhesive layer. Furthermore, with the curable pressure sensitive adhesive composition of the present invention, because the energy rays-curable component contains a polymer, a curable pressure sensitive adhesive layer having a prescribed thickness can easily be formed by applying the curable pressure sensitive adhesive composition onto a substrate and drying.

The curable pressure sensitive adhesive layer of an optical disk producing sheet of the present invention has a low volume shrinkage rate upon curing, and high adhesive strength, and hence warping of an optical disk obtained is suppressed, and inter-layer peeling can be prevented. Moreover, the rigidity of the curable pressure sensitive adhesive layer after curing is high, and hence the rigidity of the optical disk obtained can be improved. Furthermore, corrosion of an information recording layer thin metal layer adjacent to the curable pressure sensitive adhesive layer can be prevented.

An optical disk of the present invention is produced using such an optical disk producing sheet, and hence warping is suppressed, inter-layer peeling is not prone to occurring, rigidity is high, and corrosion resistance of an information recording layer thin metal layer is excellent.

BEST MODE FOR CARRYING OUT THE INVENTION

Figure 1:
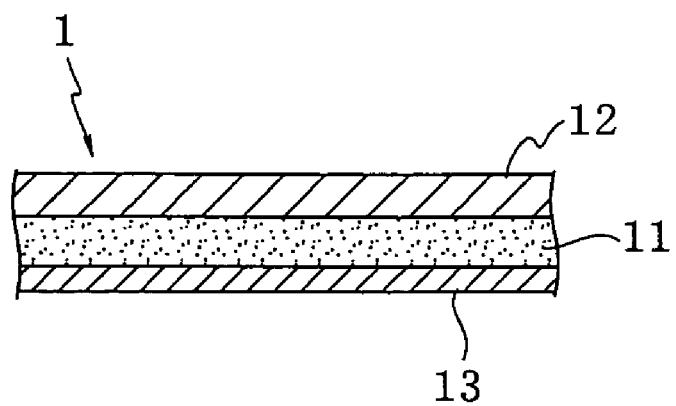
FIG. 1 is a sectional view of an optical disk producing sheet according to an embodiment of the present invention.
Figure 2:
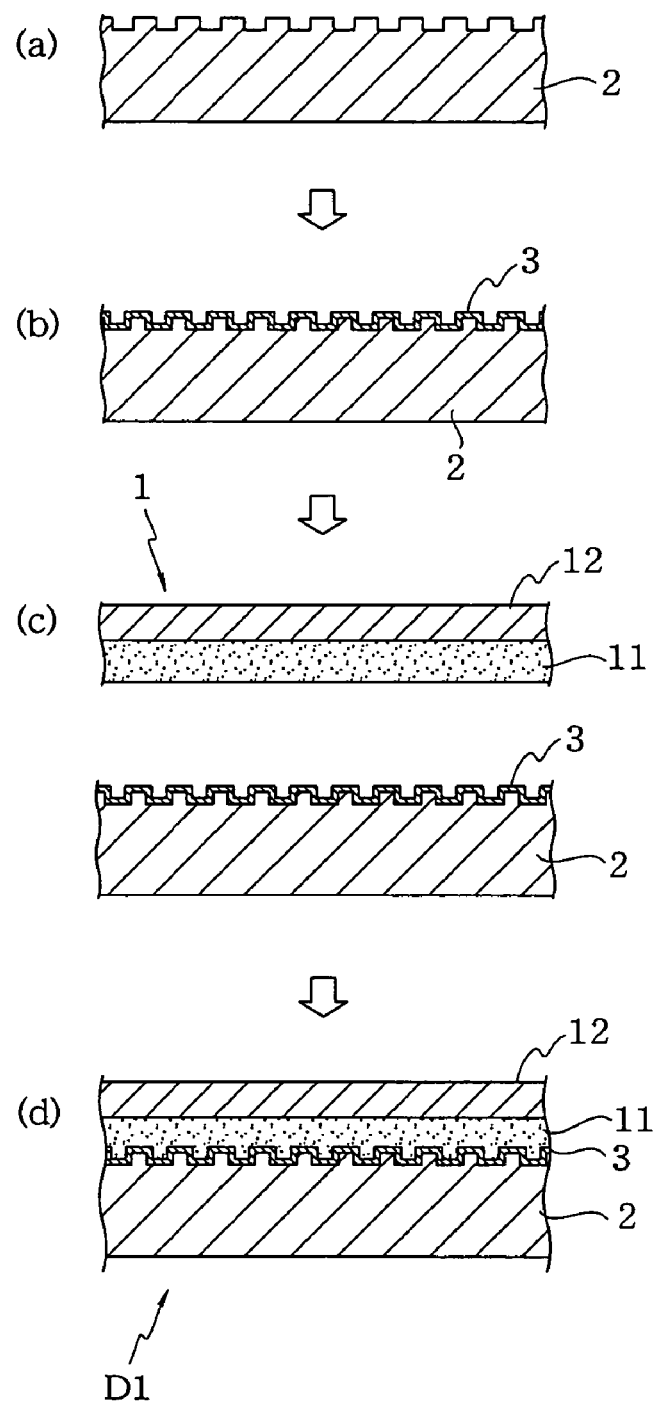
FIG. 2 consists of sectional views showing an example of a method of producing an optical disk using the optical disk producing sheet according to the above embodiment.

Following is a description of embodiments of the present invention.

[Curable Pressure Sensitive Adhesive Composition]

A curable pressure sensitive adhesive composition according to the present embodiment contains a polymer-containing energy rays-curable component (I), fine particles having an average particle diameter of not more than 30 nm (II), and if desired third components (III).

This curable pressure sensitive adhesive composition is suitable for forming a curable pressure sensitive adhesive layer for bonding together a certain layer (e.g. a protective layer) and another layer (e.g. an information recording layer) in optical disk production, and for forming a stamper-receiving layer, and the following description will be given assuming these uses. However, the uses of the curable pressure sensitive adhesive composition according to the present invention are not limited to these. Rather the curable pressure sensitive adhesive composition according to the present invention can be used in any desired use so long as at least one of the effects of the curable pressure sensitive adhesive composition according to the present invention is exhibited.

I. Polymer-Containing Energy Rays-Curable Component

The polymer-containing energy rays-curable component (I) may have an energy rays-curable polymer as a principal component thereof, or may have a mixture of a polymer that is not energy rays-curable and energy rays-curable polyfunctional monomer(s) and/or oligomer(s) as a principal component thereof.

Following is a description of the case that the polymer-containing energy rays-curable component (I) has an energy rays-curable polymer as a principal component thereof.

The energy rays-curable polymer is preferably an acrylate copolymer having energy rays-curable groups on side chains thereof. Moreover, the acrylate copolymer is preferably an energy rays-curable copolymer (A) having energy rays-curable groups on side chains thereof and having a weight average molecular weight of at least 100,000, obtained by reacting together an acrylic copolymer (a1) having functional group-containing monomer units and an unsaturated group-containing compound (a2) having a substituent that will bond to this functional group.

Here, the average side chain introduction rate of the energy rays-curable groups is preferably from 0.1 to 50 mol %, particularly preferably from 5 to 30 mol %. If the average side chain introduction rate of the energy rays-curable groups is less than 0.1 mol %, then it will not be possible to obtain the desired energy ray curability, whereas if the average side chain introduction rate of the energy rays-curable groups is greater than 50 mol %, then the volume shrinkage rate of the curable pressure sensitive adhesive composition upon curing may not be sufficiently low.

The average side chain introduction rate of the energy rays-curable groups is calculated using the following equation.

Average side chain introduction rate of energy rays-curable groups=(number of mols of energy rays-curable groups/total number of mols of monomers constituting acrylic copolymer)×100

The acrylic copolymer (a1) comprises constituent units derived from functional group-containing monomer(s), and constituent units derived from (meth)acrylic ester monomer(s) or derivative(s) thereof. Here, '(meth) acrylic ester monomer(s)' in the present specification means acrylic ester monomer(s) and/or methacrylic ester monomer(s).

The functional group-containing monomer(s) in the acrylic copolymer (a1) is/are each a monomer having, in the molecule thereof, a polymerizable double bond, and a functional group such as a hydroxyl group, a carboxyl group, an amino group, a substituted amino group or an epoxy group; preferably, hydroxyl group-containing unsaturated compound(s) and/or carboxyl group-containing unsaturated compound(s) is/are used.

Specific examples of such functional group-containing monomers are hydroxyl group-containing (meth)acrylates such as 2-hydroxyethyl acrylate, 2-hydroxyethyl methacrylate, 2-hydroxypropyl acrylate and 2-hydroxypropyl methacrylate, and carboxyl group-containing compounds such as acrylic acid, methacrylic acid and itaconic acid; these can be used singly, or two or more can be used in combination.

As each of the (meth) acrylic ester monomer(s) in the acrylic copolymer (a1), a cycloalkyl(meth) acrylate, benzyl (meth) acrylate, or an alkyl(meth)acrylate in which the alkyl group has from 1 to 18 carbon atoms can be used. Out of these, it is particularly preferable to use an alkyl(meth) acrylate in which the alkyl group has from 1 to 18 carbon atoms, for example methyl(meth)acrylate, ethyl(meth)acrylate, propyl (meth)acrylate, n-butyl (meth)acrylate or 2-ethylhexyl(meth) acrylate.

The acrylic copolymer (a1) generally contains the constituent units derived from the functional group-containing monomer(s) in a proportion of from 3 to 100 wt %, preferably from 5 to 40 wt %, particularly preferably from 10 to 30 wt %, and generally contains the constituent units derived from the (meth)acrylic ester monomer(s) or derivative(s) thereof in a proportion of from 0 to 97 wt %, preferably from 60 to 95 wt %, particularly preferably from 70 to 90 wt %.

The acrylic copolymer (a1) is obtained by copolymerizing the functional group-containing monomer(s) and the (meth) acrylic ester monomer(s) or derivative(s) thereof using an ordinary method, but in addition to these monomers, a small amount (e.g. not more than 10 wt %, preferably not more than 5 wt %) of dimethylacrylamide, vinyl formate, vinyl acetate, styrene or the like may also be included in the copolymerization.

The energy rays-curable copolymer (A) is obtained by reacting the acrylic copolymer (a1) having functional group-containing monomer units with the unsaturated group-containing compound (a2) having a substituent that will bond to this functional group.

The substituent possessed by the unsaturated group-containing compound (a2) can be selected as appropriate in accordance with the type of the functional group in the functional group-containing monomer units in the acrylic copolymer (a1). For example, in the case that the functional group is a hydroxyl group, an amino group or a substituted amino group, an isocyanate group is preferable as the substituent; in the case that the functional group is a carboxyl group, an isocyanate group, an aziridinyl group, an epoxy group or an oxazoline group is preferable as the substituent; in the case that the functional group is an epoxy group, an amino group, a carboxyl group or an aziridinyl group is preferable as the substituent. One such substituent is contained in each molecule of the unsaturated group-containing compound (a2).

Moreover, the unsaturated group-containing compound (a2) contains from 1 to 5, preferably 1 or 2, energy ray-polymerizable carbon-carbon double bonds in each molecule thereof. Specific examples of such unsaturated group-containing compounds (a2) include, for example, 2-methacryloyloxyethyl isocyanate, meta-isopropenyl-α,α-dimethylbenzyl isocyanate, methacryloyl isocyanate, and allyl isocyanate; acryloyl monoisocyanate compounds obtained by reacting together a diisocyanate compound or a polyisocyanate compound and hydroxyethyl(meth)acrylate; acryloyl monoisocyanate compounds obtained by reacting together a diisocyanate compound or a polyisocyanate compound, a polyol compound and hydroxyethyl(meth)acrylate; glycidyl (meth)acrylate; and (meth)acrylic acid, 2-(1-aziridinyl)ethyl (meth)acrylate, 2-vinyl-2-oxazoline, and 2-isopropenyl-2-oxazoline.

The unsaturated group-containing compound (a2) is generally used in a proportion of from 10 to 100 equivalents, preferably from 20 to 95 equivalents, particularly preferably from 25 to 90 equivalents, per 100 equivalents of the functional group-containing monomer(s) in the acrylic copolymer (a1).

In the reaction between the acrylic copolymer (a1) and the unsaturated group-containing compound (a2), the reaction temperature, pressure, solvent, and time, and whether or not a catalyst is used and the type of the catalyst if used, can be selected as appropriate in accordance with the combination of functional group and substituent. As a result, the functional group present on the side chains of the acrylic copolymer (a1) reacts with the substituent in the unsaturated group-containing compound (a2), and hence the unsaturated group is introduced onto the side chains of the acrylic copolymer (a1), whereby the energy rays-curable copolymer (A) is obtained. The reaction ratio between the functional group and the substituent in the reaction is generally at least 70%, preferably at least 80%; unreacted functional groups may remain in the energy rays-curable copolymer (A).

The amount of carboxyl groups and/or hydroxyl groups present (remaining) in the energy rays-curable copolymer (A) (the total amount of both in the case that both are present) is preferably from 0.01 to 30 mol %, more preferably from 0.5 to 25 mol %, in terms of the monomers. Note that in the case that the carboxyl groups and/or hydroxyl groups in the functional group-containing monomer(s) in the acrylic copolymer (a1) and the unsaturated group-containing compound (a2) react together, the amount of carboxyl groups and/or hydroxyl groups present will be the value calculated based on:

(number of mols of carboxyl group- and/or hydroxyl group-containing monomer(s))–(number of mols of unsaturated group-containing compound).

If carboxyl groups and/or hydroxyl groups are present in the energy rays-curable copolymer (A) as described above, then the adhesive strength between a curable pressure sensitive adhesive layer comprising the curable pressure sensitive adhesive composition and an information recording layer will be increased, and hence the strength and durability of an optical disk obtained will be improved.

The weight average molecular weight of the energy rays-curable copolymer (A) is preferably at least 100,000, particularly preferably from 150,000 to 1,500,000, yet more preferably from 200,000 to 1,000,000.

Here, in the case of using ultraviolet rays as the energy rays, by adding a photopolymerization initiator (B) to the energy rays-curable copolymer (A), the polymerization curing time and the radiation amount can be reduced.

Specific examples of such photopolymerization initiators (B) include benzophenones, acetophenones, benzoin, benzoin methyl ether, benzoin ethyl ether, benzoin isopropyl ether, benzoin isobutyl ether, benzoin benzoate, benzoin benzoate methyl, benzoin dimethyl ketal, 2,4-diethylthioxanthone, 1-hydroxy cyclohexyl phenyl ketone, benzyl diphenyl sulfide, tetramethylthiuram monosulfide, azobisisobutyronitrile, benzyl, dibenzyl, diacetyl, β-chloroanthraquinone, (2,4,6-trimethylbenzyl-diphenyl)phosphine oxide, 2-benzothiazole-N,N-diethyldithiocarbamate, oligo{2-hydroxy-2-methyl-1-[4-(1-propenyl)phenyl]propanone}, and 2,2-dimethoxy-1,2-diphenylethan-1-one. These may be used singly, or two or more may be used together. The photopolymerization initiator(s) (B) is/are preferably used in an amount in a range of 0.1 to 10 parts by weight, particularly preferably 0.5 to 5 parts by weight, per 100 parts by weight of the energy rays-curable copolymer (A) (in the case of including an energy rays-curable polyfunctional monomer/oligomer component (D), described below, per 100 parts by weight of the total amount of the energy rays-curable copolymer (A) and the energy rays-curable polyfunctional monomer/oligomer component (D)).

In the polymer-containing energy rays-curable component (I), other components may be included with the energy rays-curable copolymer (A) and the photopolymerization initiator (s) (B) as appropriate. Examples of other components include polymer components or oligomer components (C) that are not energy rays-curable, energy rays-curable polyfunctional monomer/oligomer components (D), and crosslinking agents (E).

Examples of polymer components or oligomer components (C) that are not energy rays-curable include polyacrylic esters, polyesters, polyurethanes, polycarbonates, and polyolefins; a polymer or oligomer having a weight average molecular weight of from 3,000 to 2,500,000 is preferable.

Examples of energy rays-curable polyfunctional monomer/oligomer components (D) include trimethylolpropane tri(meth)acrylate, pentaerythritol tri(meth)acrylate, pentaerythritol tetra(meth)acrylate, dipentaerythritol hexa(meth)acrylate, 1,4-butanediol di(meth)acrylate, 1,6-hexanediol di(meth)acrylate, polyethylene glycol di(meth)acrylates, polyester oligo(meth)acrylates, polyurethane oligo(meth)acrylates, and epoxy acrylates.

As a crosslinking agent (E), a polyfunctional compound that will react with a functional group possessed by the energy rays-curable copolymer (A) or the like can be used. Examples of such polyfunctional compounds include isocyanate compounds, epoxy compounds, amine compounds, melamine compounds, aziridine compounds, hydrazine compounds, aldehyde compounds, oxazoline compounds, metal alkoxide compounds, metal chelate compounds, metal salts, ammonium salts, and reactive phenol resins.

By including such other components (C) to (E) in the polymer-containing energy rays-curable component (I), the tackiness and releasability before curing, the strength after curing, the adhesiveness to another layer, the storage stability and so on can be improved. There are no particular limitations on the amount included of these other components, with this amount being set as appropriate within a range of 0 to 150 parts by weight per 100 parts by weight of the energy rays-curable copolymer (A).

Next, a description will be given of the case that the polymer-containing energy rays-curable component (I) has a mixture of a polymer component that is not energy rays-curable and energy rays-curable polyfunctional monomer(s)/oligomer(s) as a principal component thereof.

As the polymer component used in such a polymer-containing energy rays-curable component (I), for example a component as with the acrylic copolymer (a1) described earlier can be used. Out of such acrylic copolymers (a1), it is preferable to select an acrylic copolymer having a carboxyl group as the functional group, since then the adhesive strength to an information recording layer will be increased.

Moreover, as the energy rays-curable polyfunctional monomer(s)/oligomer(s), one(s) as with component (D) described earlier is/are selected. The mixing ratio between the polymer component and the energy rays-curable polyfunctional monomer(s)/oligomer(s) is preferably from 10 to 150 parts by weight, particularly preferably from 25 to 100 parts by weight, of the polyfunctional monomer(s)/oligomer(s) per 100 parts by weight of the polymer component.

In this case, photopolymerization initiators (B) and crosslinking agents (E) as described earlier can be included as appropriate.

II. Fine Particles

As the fine particles (II), it is preferable to use inorganic oxide particles, in particular inorganic oxide particles modified with an organic material. Inorganic oxide particles have high polarity as is, and hence can easily be dispersed in a polar solvent such as water, but have low dispersibility in organic solvents, polymer solutions containing an organic solvent, polyfunctional monomers/oligomers and so on, making mixing difficult; however, by modifying with an organic material, the dispersibility to such organic solvents and so on can be improved.

Examples of the inorganic oxide particles include particles of silica, alumina, zirconia, titanium oxide, zinc oxide, germanium oxide, indium oxide, tin oxide, antimony oxide, cerium oxide and so on; one of these can be used alone, or two or more can be used in combination. Out of these, it is preferable to use silica particles having a uniform particle diameter, since then the optical transmittance will be high.

The modification of the inorganic oxide particles with an organic material can be carried out using an ordinary method. For example, a silane coupling agent having a structure such as $CH_2\!\!=\!\!C(CH_3)COO(CH_2)_3Si(OCH_3)_3$ is added to a colloidal silica sol, and the mixture is heated to approximately 50° C. and stirred for several hours, whereby the surface of the silica particles can be modified. The structure and amount of the silane coupling agent used is selected as appropriate in accordance with the extent to which the inorganic oxide particles are required to be dispersible.

It is preferable for the fine particles (II) to be used in the form of an organosol (colloid). By using the fine particles (II) in the form of an organosol, the dispersibility of the fine particles (II) in the curable pressure sensitive adhesive composition becomes good, and hence the homogeneity and optical transmittance of the curable pressure sensitive adhesive layer obtained are improved.

As the organic solvent used in this case, methyl ethyl ketone, methyl isobutyl ketone or the like is preferable, these being excellent in terms of compatibility with the polymer-containing energy rays-curable component (I) and volatility upon adhesive layer formation.

The content of the fine particles (II) in the organosol is preferably from 10 to 50 wt %, particularly preferably from 20 to 40 wt %.

The average particle diameter of the fine particles (II) must be not more than 30 nm, and is preferably from 5 to 20 nm, particularly preferably from 10 to 15 nm. If the average particle diameter of the fine particles (II) exceeds 30 nm, then the optical transmittance of the curable pressure sensitive adhesive layer formed will be poor, and moreover the extent of improvement of properties such as the adhesive strength and the volume shrinkage rate will be low. The fine particles (II) preferably have a spherical shape.

The more uniform the particle diameter of the fine particles (II), the higher the optical transmittance, and hence the fine particles (II) preferably have a narrow particle size distribution.

As the fine particles (II) described above, commercially sold ones can be used; out of these, it is preferable to use an organo-silica sol MEK-ST or MIBK-ST made by Nissan Chemical Industries, Ltd. or the like.

By including the fine particles (II) in the curable pressure sensitive adhesive composition according to the present embodiment, the volume shrinkage rate upon curing is reduced, and moreover the adhesive strength is also increased. Furthermore, the rigidity of the curable pressure sensitive adhesive layer after curing is improved, and an effect is also obtained in that moisture is suppressed from penetrating into the curable pressure sensitive adhesive layer, and hence corrosion of a thin metal layer of an information recording layer adjacent to the curable pressure sensitive adhesive layer can be prevented.

The solid content of the fine particles (II) in the curable pressure sensitive adhesive composition is preferably from 5 to 60 wt %, particularly preferably from 20 to 40 wt %. If the content of the fine particles (II) is less than 5 wt %, then the above effects due to including the fine particles (II) will not be markedly obtained, whereas if the content of the fine particles (II) exceeds 60 wt %, then the tackiness will be poor, and moreover the adhesive strength after curing will be low, and hence the functioning as a curable pressure sensitive adhesive will be reduced.

III. Third Components

The curable pressure sensitive adhesive composition may contain third components (III) in addition to the polymer-containing energy rays-curable component (I) and the fine particles (II) described above. Examples of such third components (III) include solvents and various additives.

There are no particular limitations on a solvent so long as the solvent is one that disperses the various components described above well and has excellent volatility upon curable pressure sensitive adhesive layer formation; however, in the case of using the fine particles (II) in the form of an organosol, it is preferable to use a solvent that has excellent compatibility with the organic solvent used in the organosol.

The content of the solvent may be adjusted as appropriate such that the curable pressure sensitive adhesive composition has the desired viscosity and solid concentration, or such that the desired coatability is obtained.

Examples of additives include ultraviolet absorbers, antioxidants, tackifiers, coupling agents, and dyes. The total content of such additives is preferably from 0 to 50 parts by weight, particularly preferably from 0 to 20 parts by weight, per 100 parts by weight of the polymer-containing energy rays-curable component (I).

The curable pressure sensitive adhesive composition described above is applied onto a prescribed substrate, and drying is carried out, whereby a curable pressure sensitive adhesive layer can be formed on the surface of the substrate. Note that the substrate may be a release material.

The application of the curable pressure sensitive adhesive composition may be carried out using an ordinary method, for example bar coating, knife coating, roll coating, blade coating, die coating, or gravure coating. After the application of the curable pressure sensitive adhesive composition, the coating film is preferably dried for approximately 30 seconds to 2 minutes at approximately 60 to 100° C.

Curing of the curable pressure sensitive adhesive composition can be carried out by irradiating the coating film of the curable pressure sensitive adhesive composition with energy rays. As the energy rays, in general ultraviolet rays, electron rays, or the like are used. The irradiation dose of the energy ray varies according to the type of the energy rays, but, for example, in the case of ultraviolet rays, approximately 100 to 500 mJ/cm$^2$ in terms of light quantity is preferable, and in the case of electron rays, approximately 10 to 1000 krad is preferable.

[Optical Disk-Producing Sheet/Optical Disk (1)]

In the present embodiment, a description will be given of an optical disk producing sheet for forming a protective layer of an optical disk.

FIG. 1 is a sectional view of an optical disk producing sheet according to the present embodiment, and FIGS. 2(a) to (d) are sectional views showing an example of a method of producing an optical disk using the optical disk producing sheet according to this embodiment.

As shown in FIG. 1, the optical disk producing sheet 1 according to the present embodiment comprises a curable pressure sensitive adhesive layer 11, a protective sheet (protective layer) 12 formed on one surface of the curable pressure sensitive adhesive layer 11 (the upper surface in FIG. 1), and a release sheet 13 formed on the other surface of the curable pressure sensitive adhesive layer 11 (the lower surface in FIG. 1). Note that the protective sheet 12 is to become the protective layer in the optical disk, and the release sheet 13 is peeled off when using the optical disk producing sheet 1.

The curable pressure sensitive adhesive layer 11 is a layer for bonding together an information recording layer 3 formed on an optical disk substrate 2 (see FIG. 2) and the protective sheet 12, and is obtained by applying a curable pressure sensitive adhesive composition as described above and then drying.

The curable pressure sensitive adhesive layer 11 preferably has a pre-curing storage elastic modulus of from $1 \times 10^3$ to $5 \times 10^6$ Pa, particularly preferably from $1 \times 10^4$ to $5 \times 10^5$ Pa, and preferably has a post-curing storage elastic modulus of at least $1 \times 10^8$ Pa, particularly preferably from $1 \times 10^8$ to $1 \times 10^{10}$ Pa.

Note that the measurement temperature for the pre-curing storage elastic modulus of the curable pressure sensitive adhesive layer 11 is made to be the same as the temperature of the working environment when the optical disk producing sheet 1 and the optical disk substrate 2 are placed together (compression-bonded). In general, the optical disk producing sheet 1 and the optical disk substrate 2 are placed together at room temperature, and hence the storage elastic modulus is measured at room temperature. On the other hand, the measurement temperature for the post-curing storage elastic modulus of the curable pressure sensitive adhesive layer 11 is made to be the same as the temperature of use of the produced optical disk, i.e. the temperature in the vicinity of a recording layer when reading/writing is carried out using a laser (approximately 80° C.).

If the pre-curing storage elastic modulus of the curable pressure sensitive adhesive layer 11 is in a range as above, then the protective sheet 12 and the information recording layer 3 can easily be bonded together by compression-bonding the optical disk producing sheet 1 onto the optical disk substrate 2. Moreover, if the post-curing storage elastic modulus of the curable pressure sensitive adhesive layer 11 is in a range as above, then the protective sheet 12 and the optical disk substrate 2 can be bonded and fixed together reliably, and hence the reliability of the optical disk D1 obtained in terms of strength, durability and so on can be secured.

The thickness of the curable pressure sensitive adhesive layer 11 is set in accordance with the number of recording layers in the optical disk, the disk structure and so on, but is generally approximately from 1 to 100 μm, preferably approximately from 5 to 30 μm.

The protective sheet 12 in the present embodiment is for protecting the information recording layer 3 in the optical disk D1, and constitutes the light-receiving surface of the optical disk D1.

The material of the protective sheet 12 should basically be one having sufficient optical transmittance in the wavelength region of the light for reading/writing information, but is also preferably one having suitable degrees of rigidity and flexibility so that the optical disk D1 can be produced easily, and moreover is preferably one that is stable to temperature for storage of the optical disk D1. As such a material, for example a resin such as a polycarbonate, polymethyl methacrylate or a polycyloolefin can be used.

The coefficient of linear expansion of the protective sheet 12 is preferably approximately the same as the coefficient of linear expansion of the optical disk substrate 2 so as not to bring about warping of the optical disk at high temperature. For example, in the case that the optical disk substrate 2 is made of a polycarbonate resin, it is preferable for the protective sheet 12 to be made of the same polycarbonate resin.

The thickness of the protective sheet 12 is set in accordance with the type of the optical disk D1, the thickness of the optical disk substrate 2, and so on, but is generally approximately from 25 to 300 μm, preferably approximately from 50 to 200 μm.

As the release sheet 13, a conventional publicly known one can be used; for example, one obtained by subjecting a film of a resin such as polyethylene terephthalate or polypropylene to release treatment with a silicone release agent or the like can be used.

To make the curable pressure sensitive adhesive layer 11 smooth, the side of the release sheet 13 that has been subjected to the release treatment (the side that contacts the curable pressure sensitive adhesive layer 11) preferably has a surface roughness (Ra) of not more than 0.1 μm. Moreover, the thickness of the release sheet 13 is generally approximately from 10 to 200 μm, preferably approximately from 20 to 100 μm.

The optical disk producing sheet 1 according to the present embodiment is obtained by applying the curable pressure sensitive adhesive composition onto the protective sheet 12 and then drying to form the curable pressure sensitive adhesive layer 11, and then placing the surface of the release sheet 13 that has been subjected to the release treatment onto the surface of the curable pressure sensitive adhesive layer 11, thus laminating the release sheet 13 and the curable pressure sensitive adhesive layer 11 together, or else applying the curable pressure sensitive adhesive composition onto the surface of the release sheet 13 that has been subjected to the release treatment, and then drying to form the curable pressure sensitive adhesive layer 11, and then laminating the protective sheet 12 onto the surface of the curable pressure sensitive adhesive layer 11.

Next, a description will be given of an example of a method of producing an optical disk D1 (single-sided one-layer type) using the optical disk producing sheet 1 described above.

First, as shown in FIG. 2(a), an optical disk substrate 2 having thereon a concavo-convex pattern comprising grooves and lands is produced. This optical disk substrate 2 is generally made of a polycarbonate, and can be formed using a molding method such as injection molding.

As shown in FIG. 2(b), an information recording layer 3 is then formed on the concavo-convex pattern of the optical disk substrate 2. In the case that the optical disk is read only, this information recording layer 3 generally comprises a reflecting layer (thin metal layer), and in the case that the optical disk is rewritable, the information recording layer 3 is generally constituted from a layer made of an inorganic material or a laminate of such layers, and in particular is often constituted from a laminate comprising a reflecting layer (thin metal layer), a dielectric layer, a phase change layer and a dielectric layer in this order from the bottom. These layers can be formed using means such as sputtering.

Next, as shown in FIG. 2(c), the release sheet 13 of the optical disk producing sheet 1 is peeled off and removed, thus exposing the curable pressure sensitive adhesive layer 11, and then as shown in FIG. 2(d), the curable pressure sensitive adhesive layer 11 is compression-bonded onto the surface of the information recording layer 3 on the optical disk substrate 2.

In this state, the curable pressure sensitive adhesive layer 11 is irradiated with energy rays using an energy ray irradiating apparatus from either the side of the protective sheet 12 or the side of the optical disk substrate 2, thus curing the curable pressure sensitive adhesive layer 11.

The optical disk D1 obtained in this way is produced using an optical disk producing sheet 1 having a curable pressure sensitive adhesive layer 11 formed using a curable pressure sensitive adhesive composition as described earlier, and hence there is little cure shrinkage of the curable pressure sensitive adhesive layer 11, and thus warping of the optical disk D1 obtained is suppressed. Moreover, due to a synergistic effect between the curable pressure sensitive adhesive layer 11 having excellent adhesiveness and the curable pressure sensitive adhesive layer 11 undergoing little cure shrinkage, the protective sheet 12 and the information recording layer 3 are bonded together strongly, and hence peeling apart of the protective sheet 12 and the information recording layer 3 during production of the optical disk D1 or during storage of the optical disk D1 after production is prevented. Furthermore, the curable pressure sensitive adhesive layer 11 has high rigidity after curing, and hence the rigidity of the optical disk D1 is higher than that of an optical disk using a curable pressure sensitive adhesive layer not containing fine particles (II). Moreover, corrosion resistance of the thin metal layer of the information recording layer 3 in the optical disk D1 is also improved. In this way, the optical disk D1 has excellent strength and durability.

[Optical Disk-Producing Sheet/Optical Disk (2)]

In the present embodiment, a description will be given of an optical disk producing sheet for forming a stamper-receiving layer of an optical disk.

Figure 3:
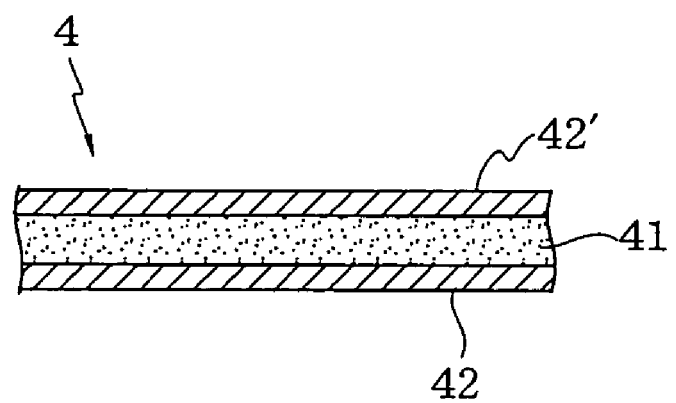
FIG. 3 is a sectional view of an optical disk producing sheet according to another embodiment of the present invention.

FIG. 3 is a sectional view of an optical disk producing sheet according to the present embodiment, and FIGS. 4(a) to (g) are sectional views showing an example of a method of producing an optical disk using the optical disk producing sheet according to this embodiment.

As shown in FIG. 3, the optical disk producing sheet 4 according to the present embodiment comprises a stamper-receiving layer (curable pressure sensitive adhesive layer) 41, and release sheets 42 and 42' formed on the two surfaces of the stamper-receiving layer 41. Note, however, that the release sheets 42 and 42' are peeled off when using the optical disk producing sheet 4.

The stamper-receiving layer 41 is a layer onto which a concavo-convex pattern formed on a stamper will be transferred to form pits or grooves/lands, and is obtained by applying on a curable pressure sensitive adhesive composition as described above and then drying.

The stamper-receiving layer 41 preferably has a pre-curing storage elastic modulus of from $1\times10^3$ to $5\times10^6$ Pa, particularly preferably from $1\times10^4$ to $5\times10^5$ Pa, and preferably has a post-curing storage elastic modulus of at least $1\times10^8$ Pa, particularly preferably from $1\times10^8$ to $1\times10^{11}$ Pa.

Note that the measurement temperature for the pre-curing storage elastic modulus of the stamper-receiving layer 41 is made to be the same as the temperature of the working environment when the stamper and the optical disk producing sheet 4 are placed together (compression-bonded). That is, in the case that the stamper and the optical disk producing sheet 4 are placed together at room temperature, the storage elastic modulus is measured at room temperature, and in the case that the stamper and the optical disk producing sheet 4 are placed together under heating, the storage elastic modulus is measured at this heating temperature. Moreover, the measurement temperature for the post-curing storage elastic modulus of the stamper-receiving layer 41 is made to be the same as the temperature of use of the produced optical disk, i.e. the temperature in the vicinity of a recording layer when reading/writing is carried out using a laser (approximately 80° C.).

If the pre-curing storage elastic modulus of the stamper-receiving layer 41 is in a range as above, then the concavo-convex pattern formed on the stamper can be precisely transferred onto the stamper-receiving layer 41 merely by pressing the stamper against the stamper-receiving layer 41, and hence optical disk production will be extremely easy.

Moreover, if the post-curing storage elastic modulus of the stamper-receiving layer 41 is in a range as above, then the pits or grooves/lands transferred onto the stamper-receiving layer 41 will be fixed reliably through the curing, and hence there will be no risk of the pits or grooves/lands being destroyed or deformed when the stamper and the stamper-receiving layer 41 are separated from one another.

The thickness of the stamper-receiving layer 41 is set in accordance with the number of recording layers in the optical disk, the disk structure and so on, but is generally approximately from 5 to 100 μm, preferably approximately from 5 to 60 μm.

As the release sheets 42 and 42', ones like the release sheet 13 of the optical disk producing sheet 1 according to the embodiment described earlier can be used, but out of the release sheets 42 and 42', it is preferable to make the one that is peeled off first be of a light release type, and to make the one that is peeled off afterward be of a heavy release type.

The optical disk producing sheet 4 according to the present embodiment is obtained by applying the curable pressure sensitive adhesive composition onto the release treatment-subjected surface of the release sheet 42 and then drying to form the stamper-receiving layer 41, and then placing the release treatment-subjected surface of the other release sheet 42' onto the surface of the stamper-receiving layer 41, thus laminating the release sheet 42' and the stamper-receiving layer 41 together.

Next, a description will be given of an example of a method of producing an optical disk D2 (single-sided two-layer type) using the optical disk producing sheet 4 described above and the optical disk producing sheet 1 according to the embodiment described earlier.

Figure 4:
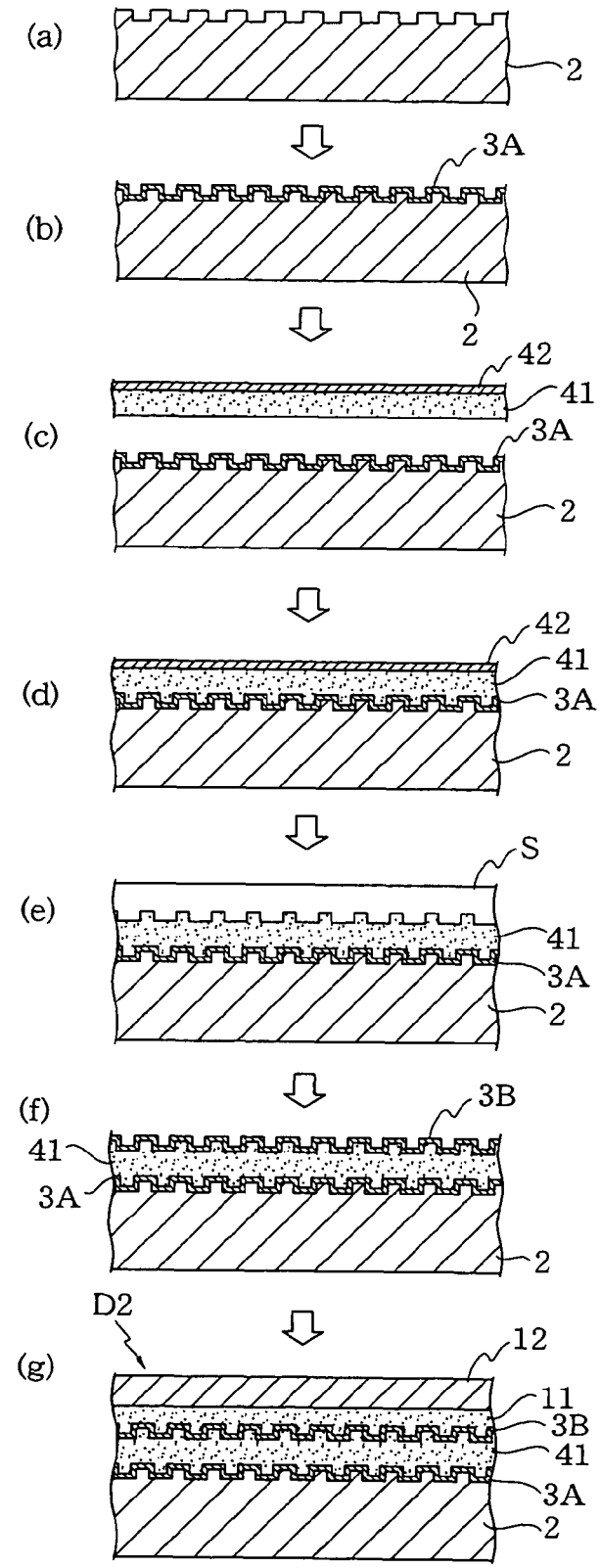
FIG. 4 consists of sectional views showing an example of a method of producing an optical disk using the optical disk producing sheet according to the above embodiment.

First, as shown in FIGS. 4(a) and (b), an optical disk substrate 2 having thereon a concavo-convex pattern comprising pits or grooves/lands is produced, and a first information recording layer 3A is formed on the concavo-convex pattern of the optical disk substrate 2. Up to here, the production can be carried out as in the method of producing the optical disk D1 in the first embodiment described earlier.

Next, as shown in FIG. 4(c), the release sheet 42' of the optical disk producing sheet 4 is peeled off and removed, thus exposing the stamper-receiving layer 41, and then as shown in FIG. 4(d), the stamper-receiving layer 41 is compression-bonded onto the surface of the information recording layer 3A on the optical disk substrate 2. Then, as shown in FIG. 4(d), the release sheet 42 formed on the stamper-receiving layer 41 is peeled off and removed, thus exposing the stamper-receiving layer 41.

Next, as shown in FIG. 4(e), a stamper S is pressed against the exposed surface of the stamper-receiving layer 41, thus transferring the concavo-convex pattern of the stamper S onto the stamper-receiving layer 41. In this state, the stamper-receiving layer 41 is irradiated with energy rays using an energy ray irradiating apparatus from either the side of the stamper S or the side of the optical disk substrate 2, thus curing the stamper-receiving layer 41.

The stamper S is made of a metal material such as a nickel alloy or a transparent resin material such as a cycloolefin resin or a polycarbonate. Note that the stamper S shown in FIG. 4(e) has a plate-like shape, but there is no limitation thereto, with a roller shape also being possible.

After the stamper-receiving layer 41 has been cured, the stamper S is separated away from the stamper-receiving layer 41. In this way, the concavo-convex pattern of the stamper S is transferred onto and fixed on the stamper-receiving layer 41, whereby pits or grooves/lands are formed, and then next, as shown in FIG. 4(f), a second information recording layer 3B is formed on the concavo-convex pattern of the stamper-receiving layer 41.

In the case that the optical disk is read only, this second information recording layer 3B generally comprises a translucent reflecting layer (thin metal layer), and in the case that the optical disk is rewritable, the second information recording layer 3B is generally constituted from a layer made of an inorganic material or a laminate of such layers, and in particular is often constituted from a laminate comprising a translucent reflecting layer (thin metal layer), a dielectric layer, a phase change layer and a dielectric layer in this order from the bottom. These layers can be formed using means such as sputtering.

Finally, as shown in FIG. 4(g), the release sheet 13 of the optical disk producing sheet 1 according to the embodiment described earlier is peeled off and removed, thus exposing the curable pressure sensitive adhesive layer 11, and then the curable pressure sensitive adhesive layer 11 is compression-bonded onto the surface of the information recording layer 3B.

In this state, the curable pressure sensitive adhesive layer 11 is irradiated with energy rays using an energy ray irradiating apparatus from either the side of the protective sheet 12 or the side of the optical disk substrate 2, thus curing the curable pressure sensitive adhesive layer 11.

The optical disk D2 obtained in this way is produced using an optical disk producing sheet 4 having a stamper-receiving layer 41 formed using a curable pressure sensitive adhesive composition as described earlier and an optical disk producing sheet 1 having a curable pressure sensitive adhesive layer 11 formed using a curable pressure sensitive adhesive composition as described earlier, and hence there is little cure shrinkage of the stamper-receiving layer 41 and the curable pressure sensitive adhesive layer 11, and thus warping of the optical disk D2 obtained is suppressed. Moreover, due to a synergistic effect between the stamper-receiving layer 41 and the curable pressure sensitive adhesive layer 11 having excellent adhesiveness and the stamper-receiving layer 41 and the curable pressure sensitive adhesive layer 11 undergoing little cure shrinkage, the stamper-receiving layer 41 and the information recording layers 3A and 3B, and the protective sheet 12 and the information recording layer 3B are bonded together strongly, and hence peeling apart of the stamper-receiving layer 41 and the information recording layer 3A or 3B, or the protective sheet 12 and the information recording layer 3B during production of the optical disk D2 or during storage of the optical disk D2 after production is prevented. Furthermore, the stamper-receiving layer 41 and the curable pressure sensitive adhesive layer 11 have high rigidity after curing, and hence the rigidity of the optical disk D2 is also high. Moreover, corrosion resistance of the thin metal layers of the information recording layers 3A and 3B in the optical disk D2 is also improved. In this way, the optical disk D2 has excellent strength and durability.

The optical disk producing methods described above are merely examples, and methods of producing optical disks using optical disk producing sheets according to the present embodiments are not limited to these producing methods.

The embodiments described above have been described to aid understanding of the present invention, not to limit the present invention. The various elements disclosed in the embodiments described above are thus deemed to also include all design variations and equivalents falling under the technical scope of the present invention.

For example, the curable pressure sensitive adhesive layer 11 in the optical disk D2 may alternatively be made of a publicly known adhesive. Moreover, the release sheets 13, 42 and 42' in the optical disk producing sheets 1 and 4 may be omitted.

EXAMPLES

Following is a more detailed description of the present invention through examples and so on; however, the scope of the present invention is not limited by these examples and so on.

Example 1

80 parts by weight of n-butyl acrylate and 20 parts by weight of acrylic acid were subjected to reaction in an ethyl acetate/methyl ethyl ketone mixed solvent (weight ratio 50:50) to obtain an acrylate copolymer solution (solid concentration 35 wt %), 2-methacryloyloxyethyl isocyanate was added as an unsaturated group-containing compound to the acrylate copolymer solution such that there were 30 equivalents of isocyanate groups per 100 equivalents of carboxyl groups in acrylic acid in the acrylate copolymer, and reaction was carried out for 48 hours at 40° C. under a nitrogen atmosphere, thus obtaining an energy rays-curable copolymer of weight average molecular weight approximately 500,000 having energy rays-curable groups on side chains thereof. The average side chain introduction rate of the energy rays-curable groups in the energy rays-curable copolymer obtained was 9.3 mol %, and the amount of carboxyl groups present in the energy rays-curable copolymer was 21.5 mol %.

100 parts by weight in terms of solids of an energy rays-curable bifunctional epoxy acrylate oligomer (Kayarad UX-3204, made by Nippon Kayaku Co., Ltd.), 6.0 parts by weight of 2,2-dimethoxy-1,2-diphenylethan-1-one (trade name Irgacure I-651, made by Ciba Specialty Chemicals K. K.) as a photopolymerization initiator, and 1.67 parts by weight of a crosslinking agent made of polyisocyanate compound (Coronate L, made by Nippon Polyurethane Industry Co., Ltd., solid concentration: 75 wt %) were dissolved in 100 parts by weight in terms of solids of the energy rays-curable copolymer solution, and the solid concentration was adjusted to 50 wt %, thus obtaining an energy rays-curable component.

100 parts by weight of an organo-silica sol (MEK-ST, made by Nissan Chemical Industries, Ltd., average particle diameter: 12 nm, solvent: methyl ethyl ketone, fine particle content: 30 wt %) was dispersed in 414.5 parts by weight of the energy rays-curable component obtained, and the solid concentration was adjusted to 45 wt %, thus obtaining a curable pressure sensitive adhesive composition (silica fine particle solid content: 12.6 wt %).

Two types of release sheet were prepared, that is a heavy release type release sheet (SP-PET3811, made by Lintec Corporation, surface roughness (Ra): 0.016 μm) obtained by subjecting one surface of a polyethylene terephthalate (PET) film (thickness: 38 μm) to release treatment with a heavy release type silicone resin, and a light release type release sheet (SP-PET38GS, made by Lintec Corporation, surface roughness (Ra): 0.016 μm) obtained by subjecting one surface of a PET film (thickness: 38 μm) to release treatment with a light release type silicone resin.

The above curable pressure sensitive adhesive composition was applied using a knife coater onto the release treatment-subjected surface of the heavy release type release sheet, and drying was carried out for 1 minute at 90° C., thus forming a curable pressure sensitive adhesive layer (stamper-receiving layer) of thickness approximately 25 μm, and then the release treatment-subjected surface side of the light release type release sheet was stuck onto the surface of this adhesive layer, thus obtaining an optical disk producing sheet.

Example 2

A curable pressure sensitive adhesive composition (silica fine particle solid content: 22.5 wt %) was prepared as in Example 1, except that the amount added of the organo-silica sol was made to be 200.0 parts by weight, and an optical disk producing sheet was produced as in Example 1 using this curable pressure sensitive adhesive composition.

Example 3

A curable pressure sensitive adhesive composition (silica fine particle solid content: 32.5 wt %) was prepared as in Example 1, except that the amount added of the organo-silica sol was made to be 333.3 parts by weight, and an optical disk producing sheet was produced as in Example 1 using this curable pressure sensitive adhesive composition.

Example 4

A curable pressure sensitive adhesive composition (silica fine particle solid content: 50.0 wt %) was prepared as in Example 1, except that the amount added of the organo-silica sol was made to be 690.8 parts by weight, and an optical disk producing sheet was produced as in Example 1 using this curable pressure sensitive adhesive composition.

Example 5

The light release type release sheet of the optical disk producing sheet produced in Example 3 was peeled off, and a polycarbonate film (Pure-Ace C110-75, made by Teijin Chemicals Ltd.) of thickness 75 μm was stuck onto the exposed adhesive layer using a roll laminator. The laminate obtained was punched into a concentric donut shape of outside diameter 119.4 mm and inside diameter 22.5 mm, thus obtaining an optical disk producing sheet for a protective layer.

Comparative Example 1

A curable pressure sensitive adhesive composition (silica fine particle solid content: 0 wt %) was prepared as in Example 1, except that the organo-silica sol was not included, and an optical disk producing sheet was produced as in Example 1 using this curable pressure sensitive adhesive composition.

Comparative Example 2

A curable pressure sensitive adhesive composition (silica fine particle solid content: 4.5 wt %) was prepared as in Example 1, except that the amount added of the organo-silica sol was made to be 32.9 parts by weight, and an optical disk producing sheet was produced as in Example 1 using this curable pressure sensitive adhesive composition.

Comparative Example 3

A curable pressure sensitive adhesive composition (silica fine particle solid content: 75.0 wt %) was prepared as in Example 1, except that the amount added of the organo-silica sol was made to be 2072.5 parts by weight, and an optical disk producing sheet was produced as in Example 1 using this curable pressure sensitive adhesive composition.

Comparative Example 4

A curable pressure sensitive adhesive composition (silica fine particle solid content: 67.0 wt %) was prepared as in Example 1, except that the amount added of the organo-silica sol was made to be 1402.6 parts by weight, and an optical disk producing sheet was produced as in Example 1 using this curable pressure sensitive adhesive composition.

Test Examples

1. Measurement of Storage Elastic Modulus

The pre-curing storage elastic modulus of the curable pressure sensitive adhesive layer of the optical disk producing sheet produced in each Example or Comparative Example was measured at 25° C. at 1 Hz using a viscoelasticity measuring apparatus (made by Rheometrics, apparatus name: Dynamic Analyzer RDA II). The results are shown in Table 1.

Moreover, the curable pressure sensitive adhesive layer of the optical disk producing sheet produced in each Example or Comparative Example was irradiated with ultraviolet rays (using an Adwill RAD-2000 m/8 made by Lintec Corporation; irradiation conditions: luminance 339 mW/cm$^2$, light quantity 212 mJ/cm$^2$), and then the post-curing storage elastic modulus of the cured adhesive layer was measured at 80° C. at 3.5 Hz using a viscoelasticity measuring apparatus (Rheovibron DDV-II-EP, made by Orientec Co., Ltd). The results are shown in Table 1.

2. Measurement of Volume Shrinkage Rate, Transmittance and Thickness

The curable pressure sensitive adhesive layer of the optical disk producing sheet produced in each Example or Comparative Example was irradiated with ultraviolet rays (using an Adwill RAD-2000 m/8 made by Lintec Corporation; irradiation conditions: luminance 339 mW/cm$^2$, light quantity 212 mJ/cm$^2$), and then the volume shrinkage rate, the transmittance and the thickness of the cured adhesive layer were measured.

The volume shrinkage rate was measured by thermomechanical analysis (TMA). The transmittance was measured at an optical wavelength of 405 nm using a UV/visible spectrophotometer (UV-3100PC, made by Shimadzu Corporation). The thickness was measured using a contact type thickness gauge (fixed pressure thickness measuring instrument PG-02, made by Teclock). The results are shown in Table 1.

3. Measurement of Tackiness and Adhesive Strength

The tackiness of the curable pressure sensitive adhesive layer of the optical disk producing sheet produced in each Example (except Example 5) or Comparative Example was measured in accordance with JIS Z0237. Specifically, the light release type release sheet was peeled off from a test piece obtained by cutting the optical disk producing sheet produced in the Example or Comparative Example to 2.5 cm×15.0 cm, and a polyethylene terephthalate (PET) film (thickness: 38 µm) was compression-bonded with a pressure of 20 N onto the exposed surface of the curable pressure sensitive adhesive layer.

Next, the heavy release type release sheet was peeled off from the test piece, and the exposed adhesive layer was compression-bonded with a pressure of 20 N onto a stainless steel plate that had been polished with #280 sandpaper. After that, the PET film was peeled away from the curable pressure sensitive adhesive layer with a peeling angle of 180° within 30 minutes, and the load at this time (the 180° peel strength) was measured. The result is shown as the tackiness (N/25 mm) in Table 1.

In another test, the light release type release sheet was peeled off from the test piece, and the exposed surface of the curable pressure sensitive adhesive layer was compression-bonded with a pressure of 20 N onto a polycarbonate plate on which a thin silver alloy layer of thickness approximately 50 nm had been formed by sputtering.

The laminate obtained was irradiated with ultraviolet rays (using an Adwill RAD-2000 m/8 made by Lintec Corporation; irradiation conditions: luminance 339 mW/cm$^2$, light quantity 212 mJ/cm$^2$) from the side of the release sheet, thus curing the curable pressure sensitive adhesive layer. After that, the heavy release type release sheet was peeled off, and an adhesive sheet (PET38 PL Shin made by Lintec Corporation, thickness: 38 µm) was stuck onto the surface of the cured pressure sensitive adhesive layer. The pressure sensitive adhesive sheet was then peeled off with a peeling angle of 180° such that the curable pressure sensitive adhesive layer peeled away from the thin metal layer on the polycarbonate plate, and the load at this time (the 180° peel strength) was measured. The result is shown as the adhesive strength (mN/25 mm) in Table 1.

4. Test of Corrosiveness

The light release type release sheet was peeled off from the optical disk producing sheet produced in each Example (except Example 5) or Comparative Example, the exposed adhesive layer was stuck onto the thin metal layer surface of a polycarbonate plate on which a thin silver alloy layer of thickness approximately 50 nm had been formed by sputtering, and irradiation with ultraviolet rays was carried out (using an Adwill RAD-2000 m/8 made by Lintec Corporation; irradiation conditions: luminance 339 mW/cm$^2$, light quantity 212 mJ/cm$^2$) from the side of the release sheet, thus curing the curable pressure sensitive adhesive layer.

After that, the heavy release type release sheet was peeled off, thus obtaining a polycarbonate plate having only the cured adhesive layer formed on the thin metal layer. This polycarbonate plate was left for 150 hours in an 80° C., 90% RH constant-temperature constant-humidity bath, and then the state of corrosion of the thin metal layer surface was observed using a confocal microscope (objective lens: 50×). The case that no corrosion was observed at all was taken as '⊚', the case that only very small corrosion spots were observed was taken as '○', the case that small corrosion spots were observed to some extent was taken as 'Δ', and the case that much corrosion was clearly observed was taken as 'X'; the results are shown in Table 1.

5. Measurement of Warping of Optical Disk

A thin silver alloy layer of thickness approximately 50 nm was formed by sputtering on the surface of a polycarbonate substrate of outside diameter 120 mm and thickness 1.1 mm. The light release type release sheet was peeled off from the optical disk producing sheet produced in each Example (except Example 5) or Comparative Example, and the exposed curable pressure sensitive adhesive layer was stuck over the whole of the thin metal layer formed on the substrate. The heavy release type release sheet was then peeled off, and a polycarbonate film (Pure-Ace C110-75, made by Teijin Chemicals Ltd.) of thickness 75 µm that had been cut to the same size as the substrate was stuck onto the exposed surface of the curable pressure sensitive adhesive layer, thus obtaining an uncured optical disk (dummy).

Moreover, for the optical disk producing sheet produced in Example 5, the heavy release type release sheet was peeled off from the curable pressure sensitive adhesive layer, and the exposed curable pressure sensitive adhesive layer was stuck to the thin metal layer of a substrate as above, thus obtaining an uncured optical disk (dummy).

Next, irradiation with ultraviolet rays was carried out (using an Adwill RAD-2000 m/8 made by Lintec Corporation; irradiation conditions: luminance 339 mW/cm$^2$, light quantity 212 mJ/cm$^2$) from the side of the polycarbonate film of each uncured optical disk, thus curing the curable pressure sensitive adhesive layer, and obtaining a cured optical disk (dummy).

Each of the optical disks obtained (uncured and cured) was set in a mechanical chuck of a disk inspecting spindle motor (made by Chiba Precision Co., Ltd., motor: DSBF50G-38M-249, driver: EDA-08C-012), and using a high-precision laser angle measuring instrument (made by Keyence Corporation, sensor head: LA-2010, controller: LA-2000), collimated light was made to be incident perpendicular to the supposed horizontal plane of the optical disk, and the angle of deflection α between the incident light K1 and the reflected light K2 from the incident light K1 was measured, whereby warping of the optical disk in the radial direction (the radial skew) was measured. Five points at approximately 40 mm in the radial direction from the center of each optical disk were taken as measurement sites, and the maximum value of the variation in the warping between before and after curing the curable pressure sensitive adhesive layer was taken as the measurement value. The results are shown in Table 1.

6. Measurement of Reflectivity

For each of the cured optical disks produced in 'Measurement of warping of optical disk' above, the reflectivity was measured. The reflectivity was measured at an optical wavelength of 405 nm using a UV/visible spectrophotometer (UV-3100PC, made by Shimadzu Corporation). The results are shown in Table 1.

TABLE 1

|  | pre-curing storage elastic modulus (Pa) | post-curing storage elastic modulus (Pa) | volume shrinkage rate (%) | transmittance (%) | reflectivity (%) |
|---|---|---|---|---|---|
| Example 1 | $0.5 \times 10^5$ | $5.2 \times 10^8$ | 4.07 | 87.45 | 68.8 |
| Example 2 | $1.1 \times 10^5$ | $6.7 \times 10^8$ | 3.52 | 87.32 | 68.6 |
| Example 3 | $1.5 \times 10^5$ | $8.5 \times 10^8$ | 2.73 | 89.46 | 72.0 |
| Example 4 | $1.2 \times 10^6$ | $9.5 \times 10^8$ | 1.80 | 89.97 | 72.8 |
| Example 5 | $1.5 \times 10^5$ | $8.5 \times 10^8$ | 2.73 | 87.46 | 72.0 |
| Comparative Example 1 | $0.3 \times 10^5$ | $4.8 \times 10^8$ | 4.65 | 90.41 | 73.6 |
| Comparative Example 2 | $0.4 \times 10^5$ | $4.3 \times 10^8$ | 4.34 | 87.91 | 69.6 |
| Comparative Example 3 | unable to measure | unable to measure | unable to measure | 91.33 | unable to measure |
| Comparative Example 4 | $5.1 \times 10^6$ | unable to measure | 0.82 | 91.10 | 74.6 |

|  | thickness after curing (μm) | tackiness (N/25 mm) | adhesive strength (mN/25 mm) | corrosiveness | warping of optical disk(°) |
|---|---|---|---|---|---|
| Example 1 | 27 | 1.22 | 500 | ○ | 0.02 |
| Example 2 | 26 | 1.34 | 800 | ○ | 0.01 |
| Example 3 | 24 | 1.67 | >7000 | ◉ | 0.00 |
| Example 4 | 25 | 1.85 | 1400 | ◉ | 0.00 |
| Example 5 | 27 | not measured | not measured | not tested | 0.00 |
| Comparative Example 1 | 25 | 3.88 cf | 400 | X | 0.05 |
| Comparative Example 2 | 26 | 1.06 | 440 | Δ-X | 0.03 |
| Comparative Example 3 | 26 | tackiness: none | unable to measure | unable to test | unable to measure |
| Comparative Example 4 | 26 | 0.03–0.09 | unable to measure | unable to test | 0.00 |

As is clear from Table 1, for the optical disk producing sheets of the Examples, good measurement results were obtained for all of the volume shrinkage rate, the tackiness, the adhesive strength to a thin metal layer, the resistance to corrosion of a thin metal layer, and warping.

INDUSTRIAL APPLICABILITY

The curable pressure sensitive adhesive composition of the present invention is suitable, for example, for bonding a protective layer or forming a stamper-receiving layer in optical disk production, and the optical disk producing sheet of the present invention is suitable for manufacturing an optical disk that has little warping and is not prone to undergoing interlayer peeling.

The invention claimed is:
1. An optical disk producing sheet comprising:
   a curable pressure sensitive adhesive layer formed using a curable pressure sensitive adhesive composition including a polymer-containing energy rays-curable component and fine particles having an average particle diameter of not more than 30 nm, wherein
   the solid content of the fine particles is from 5 to 60 wt %,
   the curable pressure sensitive adhesive layer has a pre-curing storage elastic modulus of from $1 \times 10^3$ to $5 \times 10^6$ Pa, and has a post-curing storage elastic modulus of at least $1 \times 10^8$ Pa,
   the curable pressure sensitive adhesive layer acts as a stamper-receiving layer, and
   the polymer-containing energy rays-curable component comprises an acrylate copolymer having energy rays-curable pendant groups and a weight average molecular weight of 150,000 to 1,500,000.

2. The optical disk producing sheet according to claim 1, wherein a sheet constituting an optical disk protective layer is laminated on one surface of the curable pressure sensitive adhesive layer, and if necessary a release sheet is laminated on the other surface of the curable pressure sensitive adhesive layer.

3. The optical disk producing sheet according to claim 1, wherein the optical disk producing sheet further comprises a release sheet laminated on one surface or both surfaces of the stamper-receiving layer.

4. An optical disk produced using the optical disk producing sheet according to any one of claims 1 through 3.

5. An optical disk producing sheet according to claim 1, wherein the fine particles are inorganic oxide particles modified with an organic material.

6. The optical disk producing sheet according to claim 5, wherein a sheet constituting an optical disk protective layer is laminated on one surface of the curable pressure sensitive adhesive layer, and a release sheet is laminated on the other surface of the curable pressure sensitive adhesive layer.

7. The optical disk producing sheet according to claim 5, wherein the optical disk producing sheet further comprises a release sheet laminated on one surface or both surfaces of the stamper-receiving layer.

8. The optical disk producing sheet according to claim 5, wherein the inorganic oxide particles modified with the organic material include silica modified with methyl ethyl ketone.

9. An optical disk comprising:
    an optical disk substrate having a concavo-convex pattern on a first surface;
    an information recording layer formed on the concavo-convex pattern of the first surface; and
    a curable pressure sensitive adhesive layer compression-bonded onto the surface of the information recording layer, the curable pressure sensitive adhesive layer formed using a curable pressure sensitive adhesive composition including a polymer-containing energy rays-curable component and fine particles having an average particle diameter of not more than 30 nm, wherein
    the solid content of the fine particles is from 5 to 60 wt,
    the curable pressure sensitive adhesive layer has a pre-curing storage elastic modulus of from $1 \times 10^3$ to $5 \times 10^6$ Pa, and has a post-curing storage elastic modulus of at least $1 \times 10^8$ Pa,
    the curable pressure sensitive adhesive layer acts as a stamper-receiving layer, and
    the polymer-containing energy rays-curable component comprises an acrylate copolymer having energy rays-curable pendant groups and a weight average molecular weight of 150,000 to 1,500,000.

10. The optical disk of claim 9, wherein the solid content of the fine particles is from 41 to 60 wt %.

11. A method for producing an optical disk producing sheet, comprising:
    preparing a curable pressure sensitive adhesive composition including a polymer-containing energy rays-curable component and fine particles having an average particle diameter of not more than 30 nm, the solid content of the fine particles being from 5 to 60 wt %;
    applying the curable pressure sensitive adhesive composition onto a release treatment-subjected surface of a release sheet; and
    drying the curable pressure sensitive adhesive composition to form a stamper-receiving layer, wherein
    the curable pressure sensitive adhesive layer has a pre-curing storage elastic modulus of from $1 \times 10^3$ to $5 \times 10^6$ Pa, and has a post-curing storage elastic modulus of at least $1 \times 10^8$ Pa, and
    the polymer-containing energy rays-curable component comprises an acrylate copolymer having energy rays-curable pendant groups and a weight average molecular weight of 150,000 to 1,500,000.

12. The method for producing an optical disk producing sheet according to claim 11, further comprising:
    placing a release treatment-subjected surface of a second release sheet onto the exposed surface of the stamper-receiving layer, thus laminating the second release sheet and the stamper-receiving layer together.

* * * * *